Figure 6:
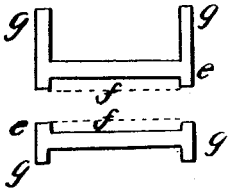
Figure 5:
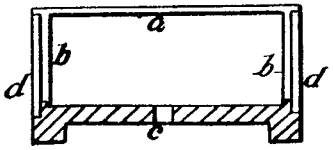
Figure 4:
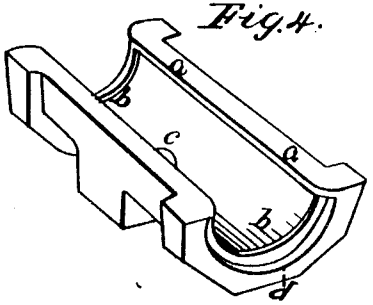

BEST AVAILABLE COPY

I. Babbitt,

Journal Box.

No. 33. A.I. Patented Sept 4, 1840.

For Journal Boxes, Masses, and indicators, see the German Patent "die Schmiervorrichtungen &c.", in this Division.